(12) United States Patent
Bailey et al.

(10) Patent No.: US 8,990,905 B1
(45) Date of Patent: Mar. 24, 2015

(54) PROTECTED RESOURCE ACCESS CONTROL UTILIZING INTERMEDIATE VALUES OF A HASH CHAIN

(71) Applicant: EMC Corporation, Hopkinton, MA (US)

(72) Inventors: Daniel V. Bailey, Pepperell, MA (US); William M. Duane, Westford, MA (US); Eric Young, Brisbane (AU)

(73) Assignee: EMC Corporation, Hopkinton, MA (US)

( * ) Notice: Subject to any disclaimer, the term of this patent is extended or adjusted under 35 U.S.C. 154(b) by 122 days.

(21) Appl. No.: 13/629,771

(22) Filed: Sep. 28, 2012

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............................................................ 726/5

(58) Field of Classification Search
CPC .................................................... H04L 2209/42
USPC ............................................................ 726/5
See application file for complete search history.

(56) References Cited

U.S. PATENT DOCUMENTS

| | | | |
|---|---|---|---|
| 7,152,165 B1 * | 12/2006 | Maheshwari et al. | 713/193 |
| 7,788,728 B2 * | 8/2010 | Kim et al. | 726/30 |
| 2005/0256910 A1 | 11/2005 | Kim et al. | |
| 2007/0150744 A1 | 6/2007 | Cheng et al. | |
| 2007/0174614 A1 | 7/2007 | Duane et al. | |
| 2007/0279227 A1 | 12/2007 | Juels | |
| 2009/0254754 A1 * | 10/2009 | Bellur et al. | 713/176 |

OTHER PUBLICATIONS

B. Groza et al., "On the Use of One-Way Chain Based Authentication Protocols in Secure Control Systems," The 2nd International Conference on Availability, Reliability and Security (ARES), Apr. 2007, pp. 1214-1221.
I. Dacosta et al., "Proxychain: Developing a Robust and Efficient Authentication Infrastructure for Carrier-Scale VoIP Networks," Proceedings of the USENIX Annual Technical Conference (ATC), Jun. 2010, 14 pages.
G. Lenzini et al., "Selective Location Blinding Using Hash Chains," Security Protocols Workshop, Mar. 2011, pp. 132-141.
K. Ren et al., "A Novel Privacy Preserving Authentication and Access Control Scheme for Pervasive Computing Environments," IEEE Transactions on Vehicular Technology, Jul. 2006, pp. 1373-1384, vol. 55, No. 4.

* cited by examiner

*Primary Examiner* — Dant Shaifer Harriman
(74) *Attorney, Agent, or Firm* — Ryan, Mason & Lewis, LLP

(57) ABSTRACT

A processing device comprises a processor coupled to a memory and is configured to associate intermediate values of a hash chain with respective access control intervals, and to provide a given one of the intermediate values to user in order to allow the user to access a protected resource in the corresponding access control interval. A final value of the hash chain is provided to an access control module associated with the protected resource, and an initial value of the hash chain is stored in a secure manner. The hash chain may be generated by applying a one-way hash function to the initial value a designated number of times in order to obtain the intermediate values and the final value. The protected resource may comprise, for example, a storage array or other processing platform component, with the intermediate values controlling service technician access to that component.

29 Claims, 4 Drawing Sheets

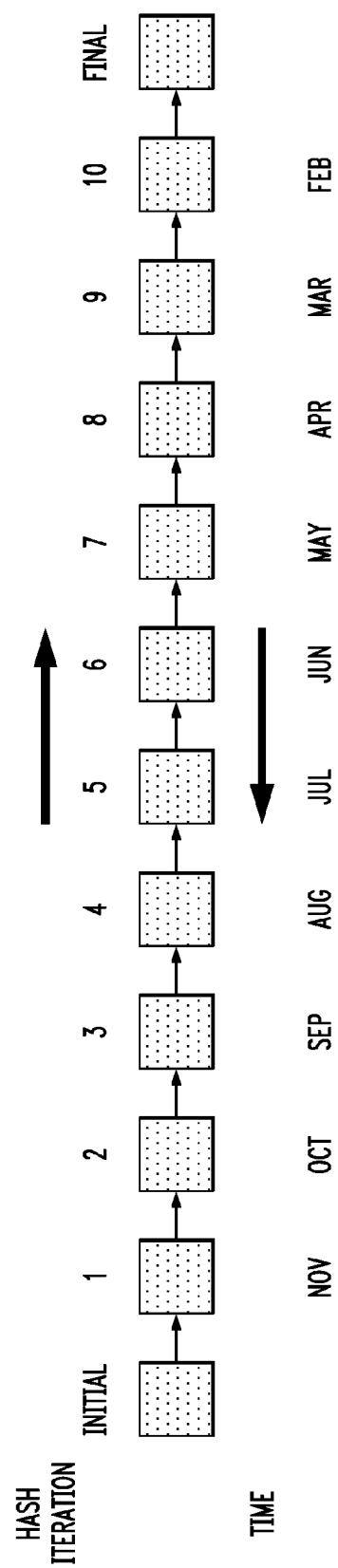

PROTECTED RESOURCE ACCESS CONTROL UTILIZING INTERMEDIATE VALUES OF A HASH CHAIN

FIELD

The field relates generally to information security, and more particularly to techniques for providing secure access to protected resources.

BACKGROUND

Numerous techniques are known for providing secure access to protected resources. One widely-used approach involves the use of one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid. The secret value is an example of what is more generally referred to herein as a "key."

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Passcodes generated by authentication tokens can also be used as secure service credentials in order to allow service technicians to access storage arrays and other processing equipment for any repairs, tests, upgrades or other service operations that may need to be performed after such equipment is deployed in the field. However, in this secure service access context, issues of key management become increasingly important. For example, a single key may be replicated on multiple storage arrays such that each of the storage arrays can support service technician access control based on passcodes generated using that same key. Such an arrangement is often desirable in that service technicians responsible for servicing a large number of storage arrays deployed in the field will need to keep track of fewer passcodes, but unfortunately it also creates a "break once, run anywhere" vulnerability in that an attacker who is able to compromise one of the storage arrays can then access any of the other storage arrays that share the same key.

SUMMARY

Illustrative embodiments of the present invention provide secure access to protected resources by utilizing intermediate values of at least one hash chain as respective access credentials. Arrangements of this type facilitate service technician access to storage arrays and other deployed processing equipment while also avoiding the above-noted "break once, run anywhere" vulnerability.

In one embodiment, a processing device comprises a processor coupled to a memory and is configured to associate intermediate values of a hash chain with respective access control intervals, and to provide a given one of the intermediate values to a user in order to allow the user to access a protected resource in the corresponding access control interval. A final value of the hash chain is provided to an access control module associated with the protected resource, and an initial value of the hash chain is stored in a secure manner. The hash chain may be generated by applying a one-way hash function to the initial value a designated number of times in order to obtain the intermediate values and the final value.

A given intermediate value received from a user attempting to access the corresponding protected resource is hashed a particular number of times determined based on a current access control interval in order to obtain a result, and if the result matches a final value of the hash chain, the user is granted access to the protected resource.

The first access control interval may correspond to the intermediate value immediately preceding the final value, such that hashing that intermediate value once yields the final value. Similarly, the second access control interval may correspond to the intermediate value that precedes the final value by two positions, such that hashing that intermediate value twice yields the final value. This inverse numbering may continue with later access control intervals corresponding to respective intermediate values that are closer to the initial value and which therefore must be hashed more times to yield the final value.

The final value of the hash chain may be provided to multiple access control modules each associated with a different protected resource. Alternatively, multiple hash chains may be used. In such an arrangement, final values for respective hash chains having respective distinct initial values may be provided to respective access control modules associated with respective protected resources.

In some embodiments, intermediate values may be associated with specific time intervals. For example, a given intermediate value might correspond to a particular hour, day, week or month. The access control module in such an embodiment may be configured to incorporate or otherwise access a clock in order to determine how many times to hash the intermediate value before the final value is reached.

Such embodiments may also be configured to protect against an attacker that attempts to tamper with the clock by either setting it forward or backward in time. More particularly, as a countermeasure to this type of attack, a given embodiment can implement clock-tampering detection using a "high water mark" approach in which the access control modules stores information identifying an access control interval associated with a received intermediate value, and compares that information to an access control interval associated with a subsequent received intermediate value.

Embodiments of the invention can additionally or alternatively be configured to protect against an attacker that intercepts an intermediate value.

The protected resources may comprise, for example, respective storage arrays or other processing platform components, with the intermediate values of one or more hash chains being used as respective secure service credentials that allow one or more service technicians to access those components.

The illustrative embodiments advantageously overcome one or more of the above-noted drawbacks of conventional practice. For example, as indicated previously, a given such embodiment can be configured to avoid the "break once, run anywhere" vulnerability associated with certain conventional arrangements, and can therefore ensure that compromise of a key that is used to validate service credentials for one storage array does not jeopardize the security of other storage arrays.

BRIEF DESCRIPTION OF THE DRAWINGS

FIG. 5 is a diagram illustrating one possible technique for associating intermediate values of a hash chain with respective access intervals in the FIG. 1 system.

DETAILED DESCRIPTION

Illustrative embodiments of the present invention will be described herein with reference to exemplary information processing systems and associated computers, servers, storage devices and other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines and other cloud infrastructure.

Figure 1:
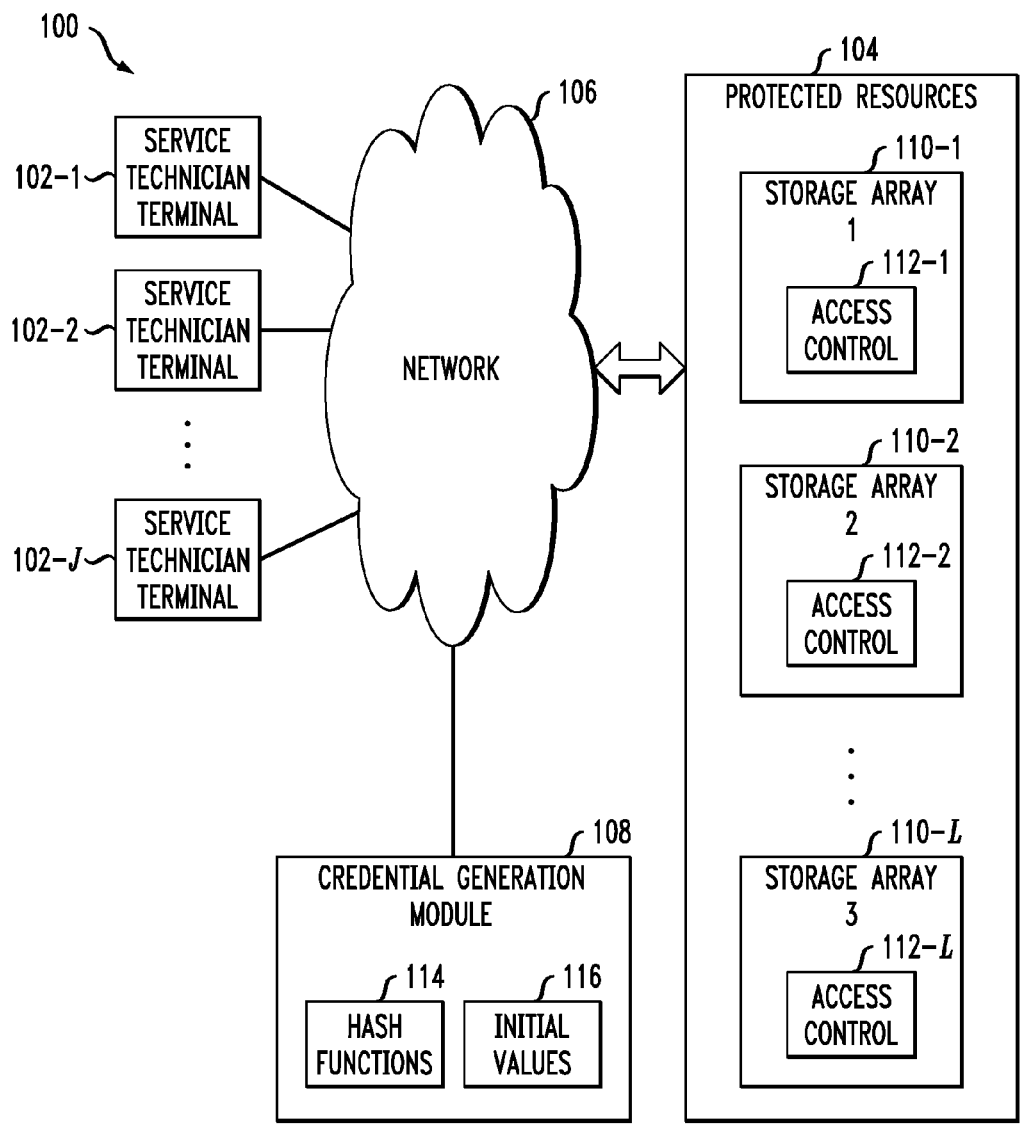
FIG. 1 shows an information processing system configured to implement secure access to protected resources based on intermediate values of one or more hash chains in an illustrative embodiment of the invention.

FIG. 1 shows an information processing system 100 configured in accordance with an illustrative embodiment of the invention. The system 100 in this embodiment comprises a plurality of terminals 102-1, 102-2, . . . 102-J that are configured to communicate with protected resources 104 over a network 106. The terminals 102 are illustratively shown as service technician terminals in this embodiment, but may be associated with other types of users in other embodiments. The term "user" as utilized herein is intended to be broadly construed so as to encompass, for example, a human user associated with a given device or set of devices, an automated user such as an application or other hardware or software component associated with a given device, or any other entity that may control that device.

Also coupled to the network 106 is a credential generation module 108 that generates secure credentials that the service technicians associated with terminals 102 utilize to access the protected resources 104. As will be described in greater detail below, the credentials generated by module 108 and provided to service technicians or other users in system 100 may comprise intermediate values of a hash chain. The service technicians may be remotely accessing the storage arrays 110 via network 106 to provide repairs, tests, upgrades or other service operations, possibly pursuant to a service contract.

The protected resources 104 in this embodiment illustratively comprise storage arrays 110-1, 110-2, . . . 110-L, with the storage arrays being configured to incorporate respective access control modules 112-1, 112-2, . . . 112-L. Although shown by way of example as being implemented within the storage arrays 110 in this embodiment, the access control modules in other embodiments may be arranged external to the storage arrays, or otherwise associated with the storage arrays, and therefore possibly on different processing platforms than the storage arrays. Moreover, a given access control module can be used to control access to multiple storage arrays or other sets of protected resources in other embodiments. Accordingly, there need not be a one-to-one correspondence between access control modules and storage arrays as illustrated in FIG. 1.

The term "access control module" as used herein is therefore intended to be broadly construed so as to encompass these and other arrangements. Such a module may be implemented at least in part using software stored in a memory of a processing device and executed by a processor of that processing device.

The protected resources are not limited to storage arrays, and may additionally or alternatively comprise, for example, other types of processing platform components and associated secure data, in any combination.

The terminals 102 may comprise computers, mobile phones or other communication devices of any kind. Such devices are implemented in the form of respective processing devices. A given such processing device generally comprises at least one processor and an associated memory, and implements one or more functional modules for controlling certain features of the system 100. Other system elements such as credential generation module 108 and access control modules 112 may also be implemented using one or more processing devices each including processor and memory elements.

The processor in a given processing device of system 100 may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks such as network 106. Such networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The network interface circuitry may comprise one or more conventional transceivers.

System elements such as elements 102, 104, 106, 108, 110 and 112 may be implemented using one or more processing platforms each comprising multiple processing devices.

Examples of processing platforms that may form portions of the system 100 will be described in more detail below in conjunction with FIGS. 3 and 4. Such processing platforms may comprise cloud infrastructure of a cloud service provider.

The system 100 in the present embodiment implements a process for controlling access to protected resources 104 by associating intermediate values of a hash chain with respective access control intervals, and providing a given one of the intermediate values to a user in order to allow the user to access one of the protected resources in the corresponding access control interval. It should be noted that the term "allow" in this context does not preclude arrangements in which additional authentication information must be presented in combination with the intermediate value in order to obtain access to the protected resource. More generally, the term is intended to cover any arrangement in which access control is conditioned at least in part on possession of a given intermediate value. For example, possession of the intermediate value may be one factor in a multi-factor authentication process that a user must complete in order to obtain access to the protected resource.

Operations such as generating hash chains, associating intermediate values of a given one of the hash chains with the access control intervals, and providing intermediate values to users may be performed at least in part by the credential generation module utilizing hash functions 114 and initial values 116. Each of the hash functions 114 may be used to hash one of the initial values 116 a particular number of times in order to generate a given hash chain that includes an initial value, a final value and a plurality of intermediate values. More particularly, the given hash chain can be generated by applying a one-way hash function to an initial value N times in order to obtain the intermediate values and a final value, where N denotes the desired number of access control intervals to be supported.

The hash functions 114 may comprise any of a number of different known one-way hash functions, including by way of example MD5, SHA-1 and SHA-256. Additional details regarding one or more of these and other conventional hash functions that may be adapted for use in embodiments of the present invention are disclosed in A. J. Menezes et al., Handbook of Applied Cryptography, CRC Press, 1997, which is incorporated by reference herein.

The credential generation module 108 may be associated with a central authority or other secure entity that generates credentials for controlling user access to protected resources 104 in the system 100. Such an entity can provide the final value of the hash chain to a given one of the access control modules 112 associated with one of the storage arrays 110 in the protected resource 104, while also storing the initial value of the hash chain in a secure manner.

In order to obtain access to the protected resource 104 in the corresponding access control interval, the user may be required to present the appropriate intermediate value of the hash chain to the access control module 112, possibly in combination with one or more pieces of additional authentication data such as a user name, PIN or password. However, it is to be appreciated that embodiments of the invention do not require the use of such additional authentication data. For example, embodiments can be configured in which service technicians and other users share no previously-agreed user name, PIN or password with the storage array or its associated access control module, and instead utilize only the intermediate value to gain access to the storage array.

The final value of the same hash chain can be provided to each of the access control modules 112 in the protected resources 104. Alternatively, multiple final values may be generated for respective hash chains having respective distinct initial values, with the multiple final values being provided to respective ones of the access control modules 112 associated with respective storage arrays 110.

A given one of the access control modules 112 receives an intermediate value of a hash chain from a user attempting to access a corresponding protected resource, and hashes the intermediate value a particular number of times determined based on a current access control interval in order to obtain a result. If the result matches the final value of the hash chain, the access control module grants the user access to the protected resource.

Thus, in the present embodiment, the credential generation module 108 knows the start of the hash chain, and can generate any of the intermediate values up to and including the final value. The access control module 112 only needs to know the final value, and specifically should not know the initial value, but can still verify a provided intermediate value by driving it forward through repeated application of the hash function to see if the result matches the expected final value. Accordingly, compromise of one of the access control modules does not release the starting point of the chain.

In the FIG. 1 embodiment, the intermediate values of a given hash chain may be viewed as comprising respective secure service credentials utilized to allow the service technicians associated with terminals 102 to access certain ones of the storage arrays 112 in particular access control intervals. However, the hash chain intermediate values are more broadly applicable for use as authentication data in a wide variety of other types of access control systems. For example, different levels of access may be provided for different users for different types of tasks to be performed in relation to a storage array or other protected resource. Such arrangements may be viewed as types of role-based access control that may be implemented in embodiments of the invention.

It is to be appreciated that the particular set of elements shown in FIG. 1 for providing access control based on intermediate values of a hash chain is presented by way of example, and in other embodiments additional or alternative elements may be used. Thus, another embodiment may include additional networks and additional sets of computers, storage devices or other types of processing devices.

As mentioned previously, various elements of system 100 such as credential generation module 108 and access control modules 112 may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

Figure 2:
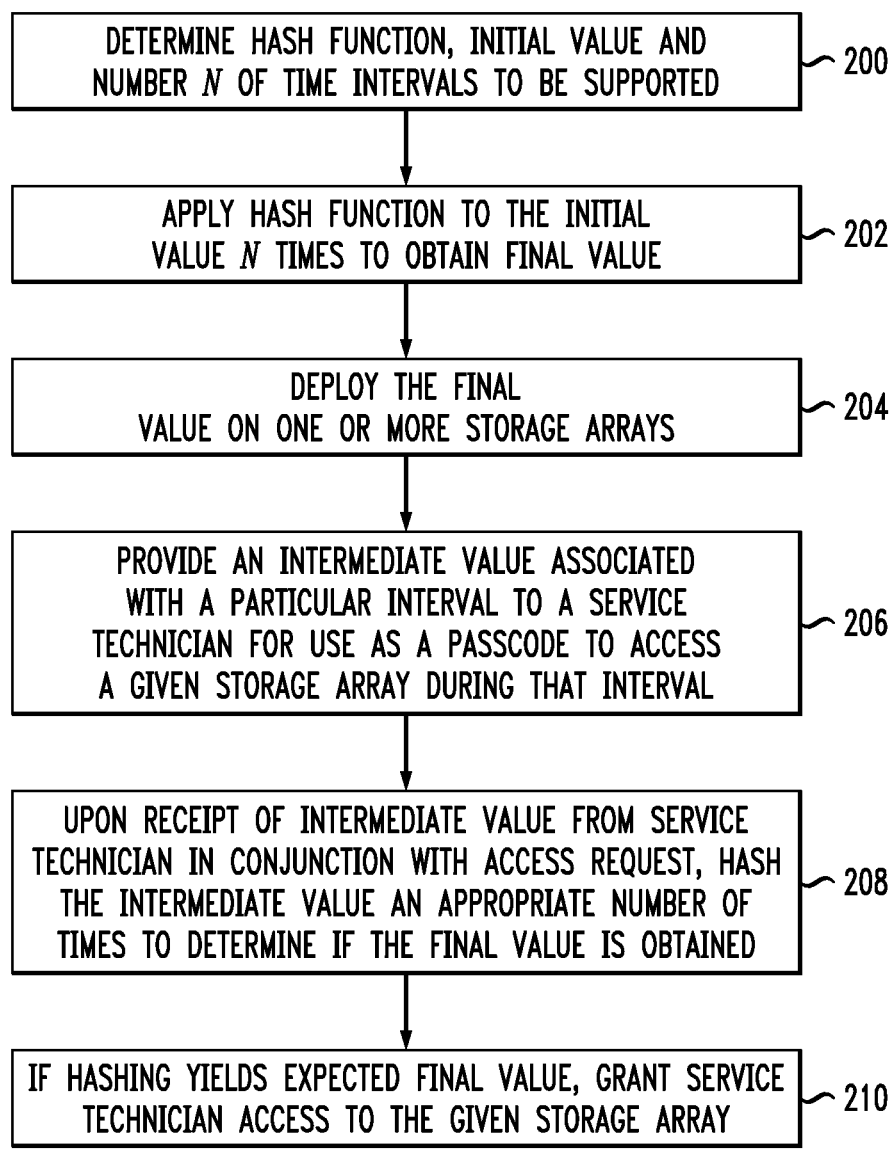
FIG. 2 is a flow diagram of a process for providing secure access to protected resources in the information processing system of FIG. 1.

FIG. 2 shows a set of operations performed by the system 100 in providing access control to protected resources 104. The process as shown includes steps 200 through 210, and it is assumed by way of example that steps 200 through 206 are performed by the credential generation module 108 and steps 208 and 210 are performed by one of the access control modules 112, although one or more of the process steps may be performed at least in part by additional or alternative system entities in other embodiments. Also, although described in the context of storage arrays, the disclosed techniques are applicable to a wide range of other types of deployed equipment or other protected resources.

The FIG. 2 embodiment is an example of a time-synchronous embodiment in which the hash chain intermediate values correspond to access intervals defined by discrete periods of time, although it is to be appreciated that other techniques may be used to define access intervals in other embodiments.

In step 200, a particular hash function, an initial value and the number N of time intervals to be supported are determined. As indicated previously, various known one-way hash functions such as MD5, SHA-1 and SHA-256 may be used as the hash function. Also, a cryptographic key may be selected as the initial value. The initial value must be protected in order to protect the security of the access control process, and accordingly should be stored in a secure memory accessible only to the credential generation module or its associated central authority or other secure entity. The number N of time intervals to be supported may be selected to accommodate at least the expected useful lifetime of the storage array. As an illustrative example, if the time intervals have a duration of one month, selecting N as 10,000 would handle many more years than the expected lifetime of the storage array.

In step 202, the hash function determined in step 200 is applied to the initial value N times in order to obtain the final value. This final value can be a public value and may be deployed on multiple storage arrays without providing any ability to compute intermediate values. The initial value is securely stored as indicated above, and the intermediate values are used as access credentials in respective access control intervals. This involves associating the intermediate values with the access control intervals.

In the present embodiment, a first one of the intermediate values immediately following the initial value of the hash chain is associated with a final one of the access control intervals, and this reverse ordering continues through the intermediate values until a final one of the intermediate values immediately preceding the final value of the hash chain is associated with a first one of the access control intervals.

Thus, the first access control interval corresponds to the intermediate value immediately preceding the final value, such that hashing that intermediate value once yields the final value. Similarly, the second access control interval corresponds to the intermediate value that precedes the final value by two positions, such that hashing that intermediate value twice yields the final value. This inverse numbering continues with later access control intervals corresponding to respective intermediate values that are closer to the initial value and which therefore must be hashed more times to yield the final value. A more detailed example of this type of association between hash chain intermediate values and access control intervals will be described below in conjunction with FIG. 5.

In step 204, the final value of the hash chain is deployed on at least one of the storage arrays 110 by providing it to the corresponding access control module 112. As mentioned above, the final value from the same hash chain can be provided to each of the storage arrays, or different final values generated for different hash chains can be provided to each of the storage arrays.

In step 206, an intermediate value associated with a particular interval is provided to a service technician for use as a passcode to access a given storage array during that interval.

In step 208, upon receipt of the intermediate value from the service technician in conjunction with access request, the intermediate value is hashed an appropriate number of times to determine if the final value is obtained.

In step 210, if the hashing in step 208 yields the expected final value, the service technician is granted access to the given storage array. Otherwise, the service technician is denied access to the given storage array.

The FIG. 2 embodiment facilitates service technician access to storage arrays and other deployed processing equipment while also avoiding the above-noted "break once, run anywhere" vulnerability associated with convention arrangements. Thus, in the context of the storage arrays 110 of FIG. 1, the use of intermediate values as secure service credentials can ensure that compromise of a key that is used to validate service credentials for one storage array does not jeopardize the security of other storage arrays. This is achieved in the present embodiment by isolating the initial value required to generate the intermediate and final values in credential generation module 108. The access control modules 112 receive only the final value or respective final values required to verify a given intermediate value upon presentation by a user in conjunction with an access request, but have no knowledge of the initial value that was used to generate the hash chain.

In an embodiment involving multiple hash chains having distinct initial values, where different final values are provided to different access control modules, the distinct initial values of the respective hash chains may be derived from a common key. For example, each of the storage arrays 110 may have associated identifying information, and the distinct initial values of the respective hash chains used to protect access to the respective storage arrays may each be determined as a function of the common key and the identifying information for the corresponding storage array. More particularly, for a given random symmetric key K, the initial value for a particular storage array 110 could be computed as $H(K, ID)$ where H is a hash function and ID is an identifying string or other identifying information for that particular storage array.

It is also possible to use the same base hash chain configuration to produce multiple distinct final values. For example, one could combine an identifier of the storage array with a common initial value using addition, XOR or other similar function. Such an arrangement may be facilitated through the use of one or more of the derivative seeds techniques disclosed in U.S. Patent Application Publication No. 2007/0174614, which is commonly assigned herewith and incorporated by reference herein.

In some embodiments, efficiency advantages can be gained by replacing a linear hash chain with one based on a tree structure. For example, a given hash chain may comprise a tree having one or more interior branches each defined by application of a one-way hash function to a common key and identifying information. As a more particular example, such an interior branch may be of the form:

$$H^{(n)}(H(H(K),ID)),$$

where n denotes a particular number of applications of hash function H, K denotes the common key and ID denotes the identifying information. In order to provide additional diversification, one could recursively apply this approach with multiple types of ID. As an example of such an arrangement, the interior branch may be of the form:

$$H^{(n)}(H(H(H(K),ID_1),ID_2)),$$

where n denotes a particular number of applications of hash function H, K denotes the common key, $ID_1$ denotes identifying information of a given one of the storage arrays 110 and $ID_2$ denotes identifying information of a service technician or other user.

It will be readily appreciated by those skilled in the art that numerous additional or alternative enhancements are possible. For example, one can use more than two ID strings. In addition, the formula $H^{(n)}(H(H(K), ID_1), ID_2))$ could have the interior hashes iterated multiple times with the exterior hash applied only once. In addition, the ID strings may be inserted at any layer of the tree.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing access control functionality based on intermediate values of one or more hash chains. For example, the ordering of the process steps may be varied in other embodiments, or certain steps may be performed concurrently with one another rather than serially. Also, one or more of the process steps, or the entire process, may be repeated periodically or on an as-needed basis responsive to particular events. As mentioned above, the steps of the FIG. 2 process are assumed to be implemented in a processing platform comprising at least one processing device having a processor coupled to a memory.

Figure 3:
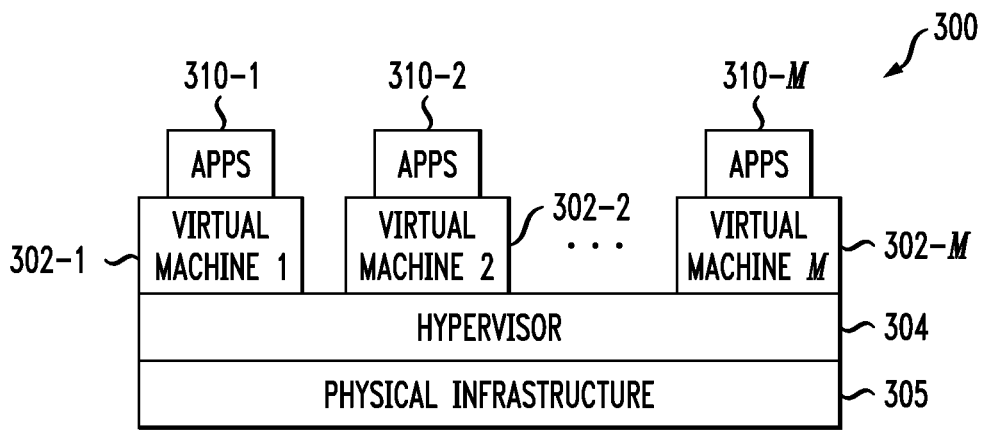
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, ... 302-M implemented using a hypervisor 304. The hypervisor 304 runs on physical infrastructure 305. The cloud infrastructure 300 further comprises sets of applications 310-1, 310-2, ... 310-M running on respective ones of the virtual machines 302-1, 302-2, ... 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as one or more of the terminals 102, protected resources 104 or credential generation module 108.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, ... 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
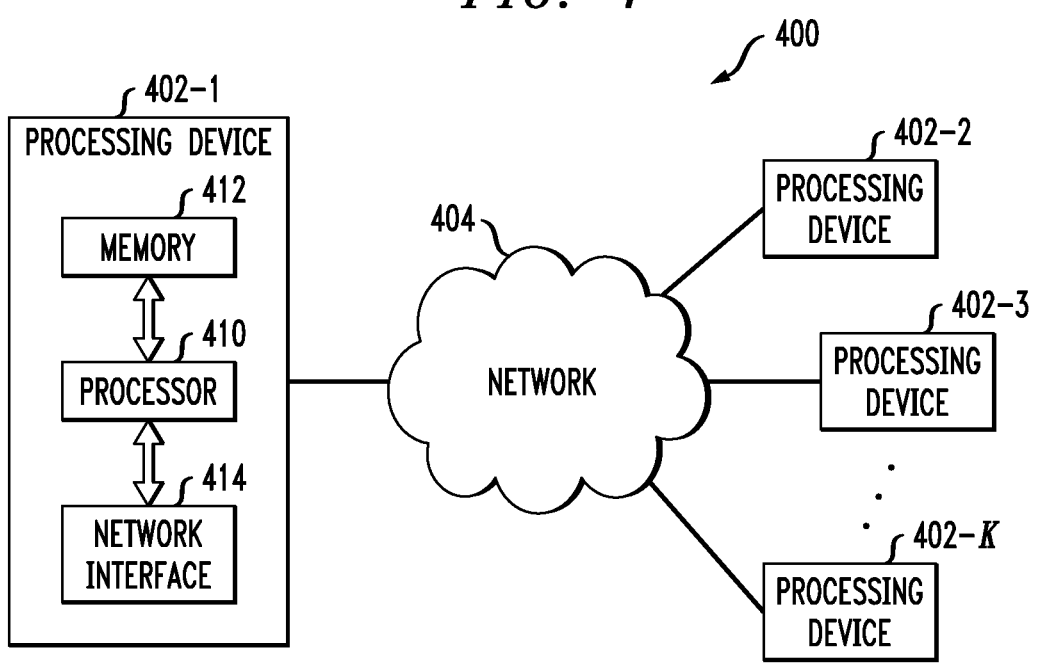

Multiple elements of information processing system 100 may be collectively implemented on a common processing platform of the type shown in FIG. 3 or 4, or each such element may be implemented on a separate processing platform.

Referring now to FIG. 5, an example of one possible association between intermediate hash chain values and respective access control intervals is shown. This may be viewed as another example of a time-synchronous embodiment in which the hash chain intermediate values correspond to access intervals defined by discrete periods of time. More particularly, in this example, the access control intervals are defined as respective months. Starting from an initial value, the hash function is iterated N=11 times to produce a sequence of 10 intermediate values numbered 1 through 10 followed by a final value, with the hash iteration process being indicated by the right-facing arrow. The final value itself is not a valid credential, but the intermediate value 10 that immediately precedes it is a valid credential. This last intermediate value 10 is associated with the first access control interval, which is the month of February in this example. The other intermediate values 9 through 1 are then associated with the other access control intervals, continuing in the reverse ordering indicated by the left-facing arrow. Thus, intermediate values 9 through 1 are associated with respective access control intervals denoted in the figure as March, April, May, June, July, August, September, October and November.

Thus, in the present embodiment, the intermediate values at the end of the hash chain are associated with the earliest access intervals. More particularly, if $H^{(n)}(IV)$ represents n applications of a designated one-way hash function H to the initial value IV, then in the figure the intermediate value for the month of November would be $H^{(1)}(IV)$, while the intermediate value for the month of February would be $H^{(10)}(IV)$.

In each of the access time intervals, the appropriate intermediate value may be given to a service technician. The service technician presents this intermediate value to the access control module 112 of the storage array 110 in conjunction with a request for service access to the storage array. The access control module then hashes the presented intermediate value to determine if it matches the expected final value. Since the hash function in the present embodiment is a one-way function and the initial value is kept secret, obtaining the final value does not help an attacker.

As noted above, other time intervals such as hours, days, weeks may be used to define access control intervals in other embodiments. In embodiments that utilize time intervals of this type to define access control intervals, a given access control module 112 may be configured to incorporate or otherwise access a clock in order to determine how many times to hash the intermediate value before the final value is reached.

Such embodiments may also be configured to protect against an attacker that attempts to tamper with the clock by either setting it forward or backward in time. More particularly, as a countermeasure to this type of attack, a given embodiment can implement clock-tampering detection. One possible implementation of clock tampering detection may proceed as follows. When the clock reaches the start of a predetermined access control interval, the access control module records this "high water mark" to disk or other non-volatile storage. Then, during the validation of an intermediate value, the access control module checks the current clock value against the stored high water mark. If the current clock value precedes the high water mark in time, the authentication request is rejected and additional auditing actions may be taken. These auditing steps may include, for example, recording the suspected clock tampering incident to a log, or alerting an administrator.

Embodiments of the invention can additionally or alternatively be configured to protect against an attacker that intercepts an intermediate value. In this case, a risk exists that the attacker may attempt to use the intercepted intermediate value just as a legitimate user would. To minimize this sort of risk, the access control module could record the received intermediate values to disk or other non-volatile storage. When a user submits an intermediate value, the access control module compares the received value against those intermediate values previously stored on disk. If a match is detected, it immediately rejects the access control request. As an optimization, the access control module could store only the intermediate value or interval identifier corresponding to the latest access control interval. If a user submits an intermediate value corresponding to an interval equal to or preceding that stored on disk, the access control request is rejected.

Accordingly, upon a successful authentication using one of the intermediate values, that intermediate value may be marked as used by the access control module, such that the access control module will no longer accept that intermediate value nor any other intermediate value closer to the final value of the hash chain. This will avoid replay attacks, or any attack where the attacker tries to intercept an intermediate value and use it to generate other intermediate values closer to the final value. Also, as indicated above, the access control module can replace its stored final value with the latest successfully-authenticated intermediate value. This makes subsequent validations more efficient, in that fewer applications of the hash function will be required to reach the new final value, while also maintaining protection against the attacks described previously.

As mentioned previously, functionality such as that described in conjunction with the system and process diagrams of FIGS. 1, 2 and 5 can be implemented at least in part in the form of one or more software programs stored in memory and executed by a processor of at least one processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platform and processing device configurations. Also, different arrangements of protected resources, credential generation modules, access control modules, hash chains, hash functions, access control intervals, hash value to interval associations, and access control processes may be used. Numerous other alternative embodiments within the scope of the appended claims will be readily apparent to those skilled in the art.

What is claimed is:

1. A method comprising:
    associating intermediate values of a hash chain with respective access control intervals;
    providing a given one of the intermediate values to a user in order to allow the user to access a protected resource in the corresponding access control interval;
    providing a final value of the hash chain to an access control module associated with the protected resource; and
    storing an initial value of the hash chain in a secure manner inaccessible to the access control module;
    wherein the final value of the hash chain is further provided to each of one or more additional access control modules associated with respective protected resources; and
    wherein said associating, providing the given one of the intermediate values, providing the final value and storing are performed by at least one processing device comprising a processor coupled to a memory.

2. The method of claim 1 wherein the associating, providing the given one of the intermediate values and providing the final value are performed by a credential generation module.

3. The method of claim 1 wherein the user is required to present the intermediate value in combination with additional authentication data in order to access the protected resource in the corresponding access control interval.

4. The method of claim 1 further comprising generating the hash chain by applying a one-way hash function to an initial value N times in order to obtain the intermediate values and a final value where N denotes the number of access control intervals.

5. A method comprising:
    associating intermediate values of a hash chain with respective access control intervals;
    providing a given one of the intermediate values to a user in order to allow the user to access a protected resource in the corresponding access control interval;
    providing a final value of the hash chain to an access control module associated with the protected resource;
    storing an initial value of the hash chain in a secure manner inaccessible to the access control module;
    generating one or more additional final values for one or more respective additional hash chains having respective distinct initial values; and
    providing the one or more additional final values to respective additional access control modules associated with respective protected resources;
    wherein said associating, providing the given one of the intermediate values, providing the final value, storing, generating and providing the one or more additional final values are performed by at least one processing device comprising a processor coupled to a memory.

6. The method of claim 1 wherein the intermediate values of the hash chain comprise authentication data utilized in an access control system.

7. The method of claim 1 wherein the intermediate values of the hash chain comprise respective secure service credentials utilized to allow at least one service technician to access the protected resource in respective ones of the access control intervals.

8. The method of claim 1 wherein associating intermediate values of the hash chain with respective access control intervals further comprises associating a first one of the intermediate values immediately following an initial value of the hash chain with a final one of the access control intervals.

9. The method of claim 1 wherein associating intermediate values of the hash chain with respective access control intervals further comprises associating a final one of the intermediate values immediately preceding a final value of the hash chain with a first one of the access control intervals.

10. The method of claim 1 wherein associating intermediate values of the hash chain with respective access control intervals comprises associating at least a portion of the intermediate values with respective ones of the access control intervals in accordance with a reverse sequential ordering.

11. The method of claim 5 wherein the distinct initial values of the respective hash chains are derived from a common key.

12. The method of claim 11 wherein each of the protected resources has associated identifying information and the distinct initial values of the respective hash chains are each determined as a function of the common key and the identifying information for the corresponding protected resource.

13. The method of claim 1 wherein the hash chain comprises a tree having one or more interior branches each defined by application of a one-way hash function to a common key and identifying information.

14. The method of claim 13 wherein the interior branch is of the form:

$$H^{(n)}(H(H(K),ID)),$$

where n denotes a particular number of applications of hash function H, K denotes the common key and ID denotes the identifying information.

15. The method of claim 13 wherein the interior branch is of the form:

$$H^{(n)}(H(H(H(K),ID_1),ID_2)),$$

where n denotes a particular number of applications of hash function H, K denotes the common key, $ID_1$ denotes identifying information of a protected resource and $ID_2$ denotes identifying information of a user.

16. A computer program product comprising a non-transitory processor-readable storage medium having encoded therein executable code of one or more software programs, wherein the one or more software programs when executed by at least one processing device cause the method of claim 1 to be performed.

17. An apparatus comprising:
at least one processing device comprising a processor coupled to a memory;
the processing device being configured to associate intermediate values of a hash chain with respective access control intervals, to provide a given one of the intermediate values to a user in order to allow the user to access a protected resource in the corresponding access control interval, to provide a final value of the hash chain to an access control module associated with the protected resource, and to store an initial value of the hash chain in a secure manner inaccessible to the access control module;
wherein the processing device is further configured to provide the final value of the hash chain to each of one or more additional access control modules associated with respective protected resources.

18. The apparatus of claim 17 wherein the protected resource comprises a storage array having an associated access control module.

19. The apparatus of claim 18 wherein the processing device is implemented on a common processing platform with the access control module.

20. A method comprising:
receiving a given intermediate value of a hash chain from a user attempting to access a corresponding protected resource;
hashing the intermediate value a particular number of times determined based on a current access control interval in order to obtain a result; and
if the result matches a final value of the hash chain, granting the user access to the protected resource;
wherein the hash chain comprises an initial value, the final value and a plurality of intermediate values including the given intermediate value;
wherein the final value is provided to each of a plurality of access control modules associated with respective protected resources and the initial value is stored in a secure manner inaccessible to the access control modules;
wherein the intermediate values of the hash chain are associated with respective access control intervals; and
wherein said receiving, hashing, and granting are performed by at least one processing device comprising a processor coupled to a memory.

21. The method of claim 20 wherein the receiving, hashing and granting are performed by the access control module.

22. The method of claim 21 wherein the access control module stores information indicative of a latest access control interval for which the module has received one of the intermediate values from a user.

23. The method of claim 22 further comprising:
comparing a current access control interval associated with a presented intermediate value with the stored information indicative of the latest access control interval; and
denying access to the protected resource if the current access control interval precedes in time the latest access control interval indicated by the stored information.

24. The method of claim 20 further comprising replacing a previously-stored final value of the hash chain with the given intermediate value if that intermediate value results in granting the user access to the protected resource, such that the given intermediate value serves as a final value in verifying a subsequently-received intermediate value.

25. A computer program product comprising a non-transitory processor-readable storage medium having encoded therein executable code of one or more software programs, wherein the one or more software programs when executed by at least one processing device cause the steps of the method of claim 20 to be performed.

26. An apparatus comprising:
at least one processing device comprising a processor coupled to a memory;
the processing device being configured to receive a given intermediate value of a hash chain from a user attempting to access a corresponding protected resource, to hash the intermediate value a particular number of times determined based on a current access control interval in order to obtain a result, and if the result matches a final value of the hash chain, to grant the user access to the protected resource;

wherein the hash chain comprises an initial value, the final value and a plurality of intermediate values including the given intermediate value;

wherein the final value is provided to each of a plurality of access control modules associated with respective protected resources and the initial value is stored in a secure manner inaccessible to the access control modules; and wherein the intermediate values of the hash chain are associated with respective access control intervals.

27. The apparatus of claim 26 wherein the protected resource comprises a storage array having associated therewith the access control module.

28. The apparatus of claim 27 wherein the processing device is implemented on a common processing platform with the access control module.

29. An apparatus comprising:
at least one processing device comprising a processor coupled to a memory;
the processing device being configured to:
associate intermediate values of a hash chain with respective access control intervals;
provide a given one of the intermediate values to a user in order to allow the user to access a protected resource in the corresponding access control interval;
provide a final value of the hash chain to an access control module associated with the protected resource;
store an initial value of the hash chain in a secure manner inaccessible to the access control module;
generate one or more additional final values for one or more respective additional hash chains having respective distinct initial values; and
provide the one or more additional final values to respective additional access control modules associated with respective protected resources.

* * * * *